United States Patent
Chao et al.

(10) Patent No.: US 10,454,946 B2
(45) Date of Patent: *Oct. 22, 2019

(54) REAL-TIME ADAPTIVE RECEIVE SIDE SCALING KEY SELECTION

(71) Applicant: International Business Machines Corporation, Armonk, NY (US)

(72) Inventors: Chih-Wen Chao, Taipei (TW); Kuo-Chun Chen, New Taipei (TW); Wei-Hsiang Hsiung, Taipei (TW); Sheng-Tung Hsu, Taipei (TW); Ming-Pin Hsueh, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/811,997

(22) Filed: Nov. 14, 2017

(65) Prior Publication Data

US 2019/0109859 A1 Apr. 11, 2019

Related U.S. Application Data

(63) Continuation of application No. 15/729,805, filed on Oct. 11, 2017.

(51) Int. Cl.
*H04L 29/06* (2006.01)
*H04L 29/08* (2006.01)
(Continued)

(52) U.S. Cl.
CPC ............. *H04L 63/12* (2013.01); *G06F 9/54* (2013.01); *G06F 13/24* (2013.01);
(Continued)

(58) Field of Classification Search
CPC ... H04L 45/742; H04L 67/142; H04L 67/008; H04L 41/0806; H04L 67/1023
See application file for complete search history.

(56) References Cited

U.S. PATENT DOCUMENTS

| 7,765,405 B2 | 7/2010 | Pinkerton et al. |
| 9,569,383 B2 | 2/2017 | Domsch et al. |

(Continued)

FOREIGN PATENT DOCUMENTS

CN 104580017 A 4/2015

OTHER PUBLICATIONS

"Introduction to Receive Side Scaling", Microsoft, Apr. 20, 2017, 4 pages. https://docs.microsoft.com/en-us/windows-hardware/drivers/networld/introduction-to-receive-side-scaling.
(Continued)

*Primary Examiner* — Kim T Nguyen
(74) *Attorney, Agent, or Firm* — Yee & Associates, P.C.; Jeffrey LaBaw

(57) ABSTRACT

Selecting a receive side scaling (RSS) key is provided. It is determined whether a defined time interval expired. In response to determining that the defined time interval has expired, it is determined whether one or more keys in a set of randomly generated candidate RSS keys have a higher packet distribution score than an active RSS key. In response to determining that one or more keys in the set of randomly generated candidate RSS keys have a higher packet distribution score than the active RSS key, an RSS key having a highest packet distribution score is selected from the one or more keys in the set of randomly generated candidate RSS keys that have a higher packet distribution score than the active RSS key. The RSS key having the highest packet distribution score is used to distribute incoming network packets across a plurality of processors.

8 Claims, 5 Drawing Sheets

(51) Int. Cl.
*G06F 13/24* (2006.01)
*G06F 9/54* (2006.01)
*G06F 9/50* (2006.01)

(52) U.S. Cl.
CPC ........ *H04L 67/1002* (2013.01); *G06F 9/5005* (2013.01); *H04L 69/30* (2013.01)

(56) References Cited

U.S. PATENT DOCUMENTS

| | | | |
|---|---|---|---|
| 2009/0006521 A1 | 1/2009 | Veal et al. | |
| 2011/0153861 A1 | 6/2011 | Chauhan | |
| 2012/0215932 A1 | 8/2012 | Shemesh | |
| 2013/0339547 A1* | 12/2013 | Nath | H04L 61/103 709/245 |
| 2014/0301388 A1 | 10/2014 | Jagadish et al. | |
| 2016/0142320 A1* | 5/2016 | Gyllenhammer | H04L 47/125 370/389 |
| 2017/0126549 A1* | 5/2017 | Paramasivam | H04L 49/9005 |
| 2019/0109858 A1* | 4/2019 | Chao | H04L 63/12 |

OTHER PUBLICATIONS

Woo et al., "Scalable TCP Session Monitoring with Symmetric Receivepside Scaling", KAIST Department of Electrical Engineering, 2012, 7 pages.
"Scalable Networking: Eliminating the Receive Processing Bottleneck—Introducing RSS", Windows Hardware and Driver Central, Apr. 14, 2004, 17 pages.
Chao et al., "Real-Time Adaptive Receive Side Scaling Key Selection", filed Oct. 11, 2017, U.S. Appl. No. 15/729,805, 35 pages.
Office Action, dated Mar. 21, 2019, regarding U.S. Appl. No. 15/729,805, 11 pages.

* cited by examiner

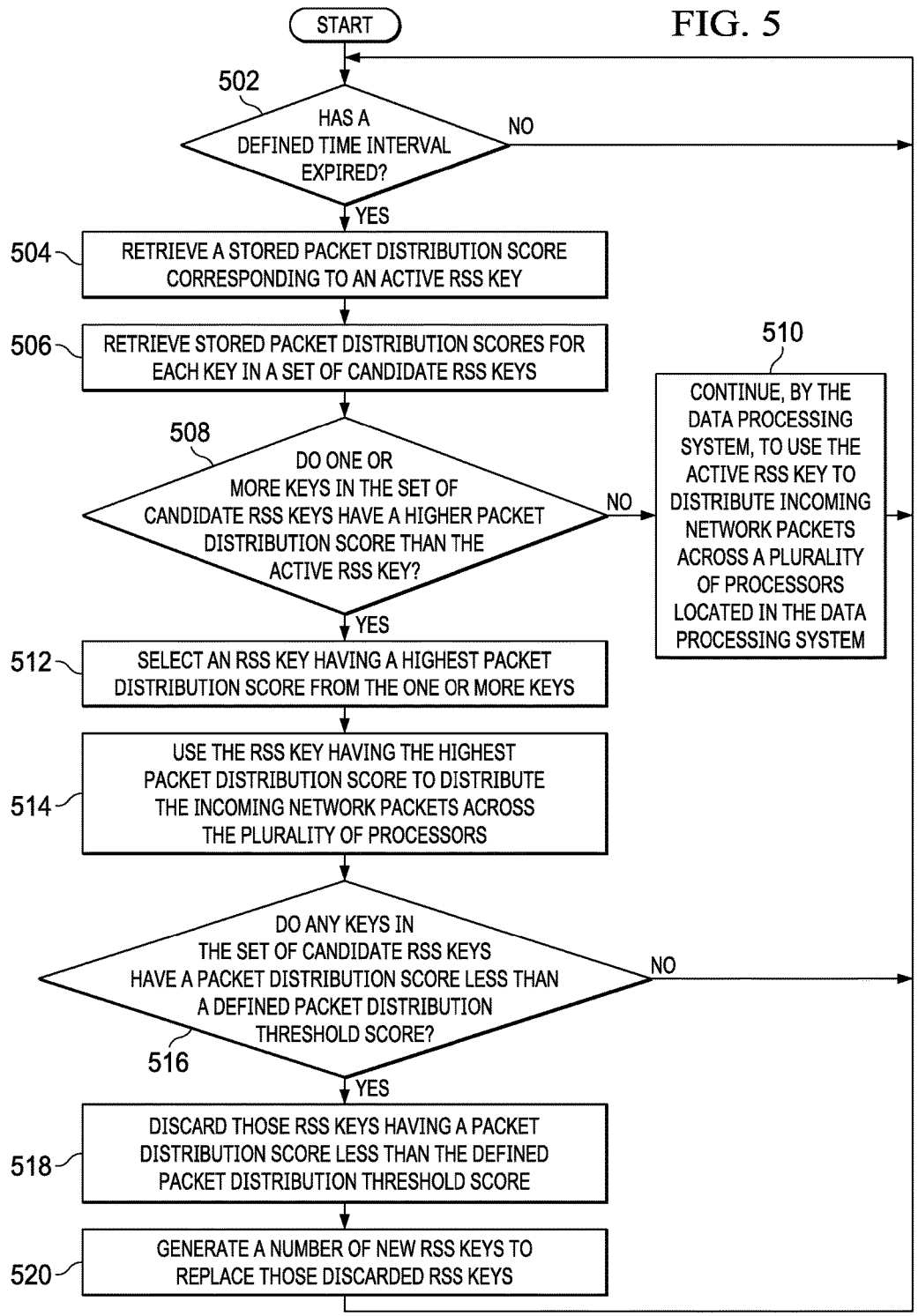

REAL-TIME ADAPTIVE RECEIVE SIDE SCALING KEY SELECTION

CROSS REFERENCE TO RELATED APPLICATIONS

The present application is a continuation application of U.S. patent application Ser. No. 15/729,805, filed on Oct. 11, 2017, entitled REAL-TIME ADAPTIVE RECEIVE SIDE SCALING KEY SELECTION.

BACKGROUND

1. Field:

The disclosure relates generally to receive side scaling and more specifically to selecting a receive side scaling key having a highest packet distribution score that uniformly distributes incoming network packets across multiple central processing units in a multiprocessor device or across multiple processor cores in a multicore central processing unit.

2. Description of the Related Art:

Receive side scaling (RSS) is a network adapter technology enabling distribution of network receive processing across multiple central processing units in a multiprocessor data processing device, such as a computer. In other words, RSS enables packet receive processing to scale with the number of processors in the multiprocessor data processing device. As a result, RSS helps to make it possible to support higher network traffic loads.

RSS uses a hash function with an RSS hash key to determine the distribution of each incoming network packet. The hash function and resulting hash value provides the means for selecting a processor in the multiprocessor data processing device. The hash function computes a hash value over a defined area within a received network packet. The defined area may be contiguous or noncontiguous. RSS uses a number of least significant bits of the hash value to index an indirection table. RSS uses the values in the indirection table to assign the received network packet to a processor. In other words, the RSS indirection table identifies a particular processor in the multiprocessor device to process the received network packet. In addition, RSS includes a signature that provides added security. This signature protects the multiprocessor device from malicious remote hosts attempting to force the multiprocessor device into an unbalanced state.

SUMMARY

According to one illustrative embodiment, a computer-implemented method for selecting a receive side scaling (RSS) key is provided. A data processing system determines whether a defined time interval expired. In response to the data processing system determining that the defined time interval has expired, the data processing system determines whether one or more keys in a set of randomly generated candidate RSS keys have a higher packet distribution score than an active RSS key. In response to the data processing system determining that one or more keys in the set of randomly generated candidate RSS keys have a higher packet distribution score than the active RSS key, the data processing system selects an RSS key having a highest packet distribution score from the one or more keys in the set of randomly generated candidate RSS keys that have a higher packet distribution score than the active RSS key. The data processing system uses the RSS key having the highest packet distribution score to distribute incoming network packets across a plurality of processors corresponding to the data processing system.

BRIEF DESCRIPTION OF THE DRAWINGS

FIG. 5 is a flowchart illustrating a process for selecting RSS keys in accordance with an illustrative embodiment.

DETAILED DESCRIPTION

Figure 1:
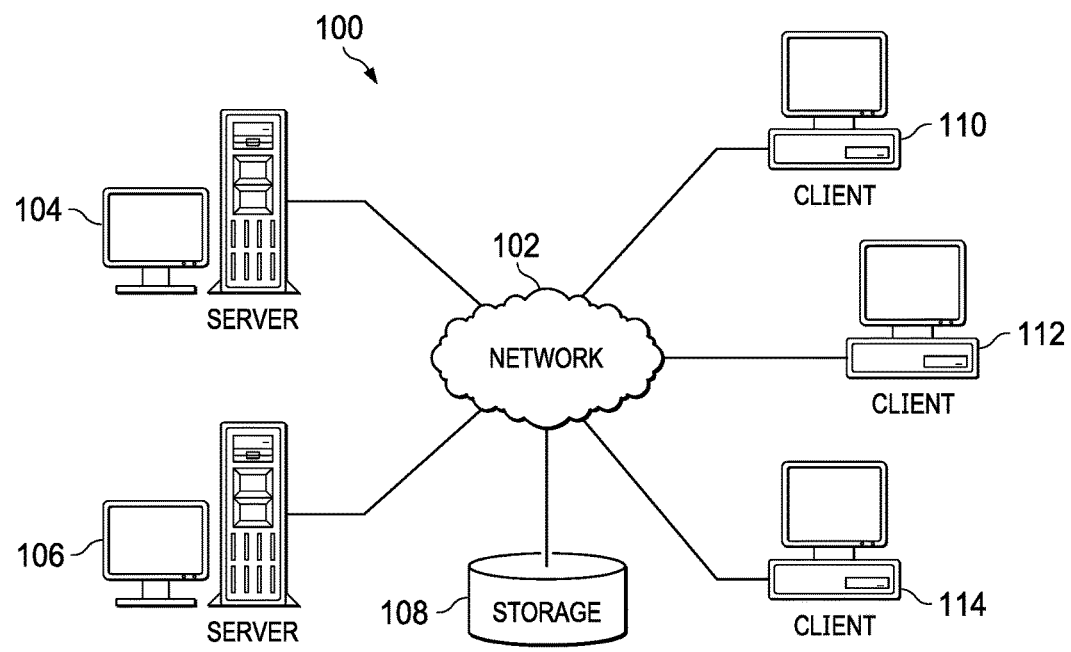
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
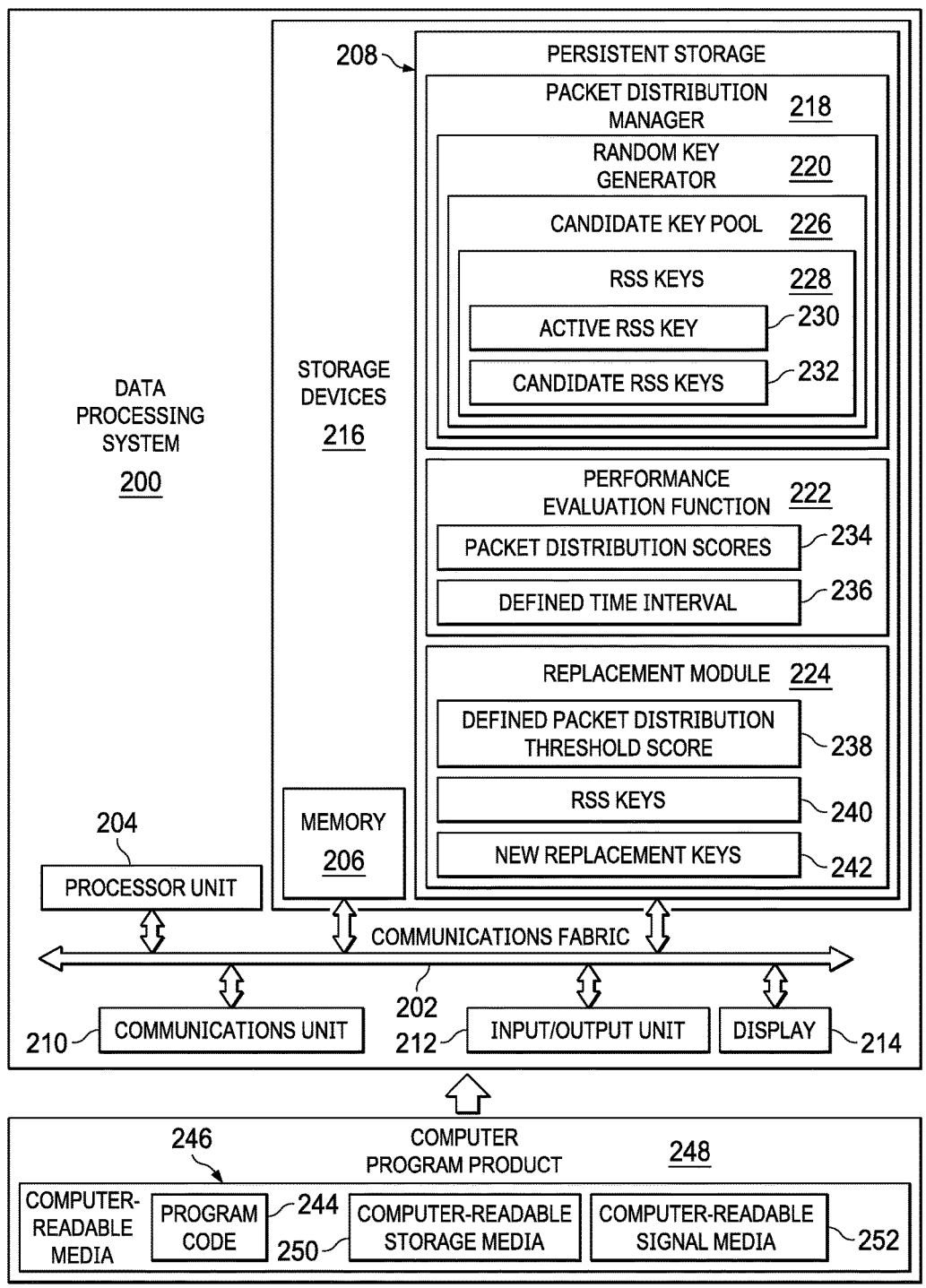
FIG. 2 is a diagram of a data processing system in which illustrative embodiments may be implemented.
Figure 3:
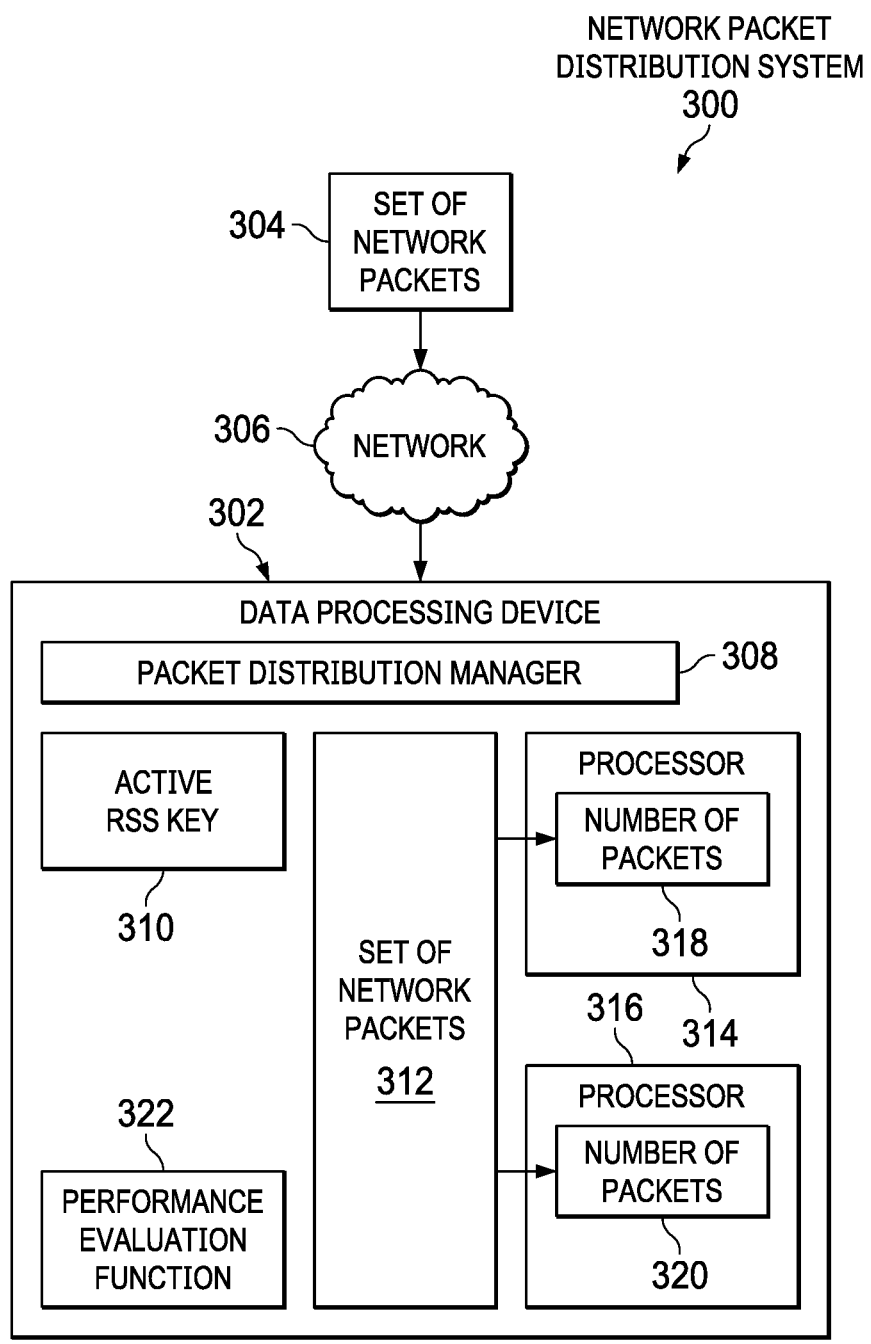
FIG. 3 is a diagram of a network packet distribution system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services to client devices. For example, server 104 and server 106 may provide intrusion prevention services or firewall services to registered client devices. Also, it should be noted that server 104 and server 106 may each represent a plurality of different servers providing a plurality of different network security services.

Client 110, client 112, and client 114 also connect to network 102. Clients 110, 112, and 114 are clients of server 104 and/or server 106. Users of clients 110, 112, and 114 may utilize clients 110, 112, and 114 to request services or information from server 104, server 106, or other data processing devices connected to network 102.

In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, personal digital assistants, gaming devices, and the like, with wire or wireless communication links to network 102.

Storage 108 is a network storage device capable of storing any type of data in a structured format or an unstructured format. In addition, storage 108 may represent a set of one or more network storage devices. Storage 108 may store, for example, identifiers for a plurality of different network devices; identifiers for a plurality of processors located in each of the plurality of different network devices; hash functions; processor network packet distribution scores; and the like. Further, storage 108 may store other data, such as authentication or credential data that may include user names, passwords, and biometric data associated with users and system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a data processing device, such as server 104 or client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. In addition, processor unit 204 processes incoming network packets to data processing system 200. In this example, processor unit 204 may represent a set of two or more hardware processor devices or may represent one processor device with two or more processor cores, depending on the particular implementation. Further, different illustrative embodiments may implement processor unit 204 using multiple heterogeneous processors or using multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores packet distribution manager 218. However, it should be noted that even though packet distribution manager 218 is illustrated as residing in persistent storage 208, in an alternative illustrative embodiment packet distribution manager 218 may be a separate component of data processing system 200. For example, packet distribution manager 218 may be a hardware component coupled to communication fabric 202 or a combination of hardware and software components.

Packet distribution manager 218 controls the processes of randomly generating RSS keys, evaluating the performance of the RSS keys in distributing incoming network packets across multiple processors or multiple processor cores, generating packet distribution scores for each of the RSS keys, selecting an RSS key having a highest packet distribution score to uniformly distribute the incoming network packets between the multiple processors or multiple processor cores, discarding RSS keys having a packet distribution score below a defined threshold score, and randomly generating replacement RSS keys. In this example, packet distribution manager 218 includes random key generator 220, performance evaluation function 222, and replacement module 224. However, it should be noted that packet distribution manager 218 may include more or fewer components than shown. For example, one component may be split into two or more components, two or more components may be combined into one component, or components not shown may be added.

Packet distribution manager 218 utilizes random key generator 220 to randomly generate a number of keys for candidate key pool 226. Candidate key pool 226 includes RSS keys 228. It should be noted that candidate key pool 226 may have a predefined size. In other words, candidate key pool 226 may only contain a predefined number of RSS keys. RSS keys 228 represent a plurality of randomly generated RSS keys. RSS keys 228 include active RSS key 230 and candidate RSS keys 232.

Active RSS key 230 represents an RSS key that packet distribution manager 218 is currently utilizing to distribute incoming network packets across the multiple processors or multiple processor cores located in data processing system 200. Candidate RSS keys 232 represent a set of two or more RSS keys that packet distribution manager 218 may utilize to replace active RSS key 230 when one or more of candidate RSS keys 232 have a higher packet distribution score than active RSS key 230.

Packet distribution manager 218 utilizes performance evaluation function 222 to evaluate how well active RSS key 230 and each of candidate RSS keys 232 are balancing the number of incoming network packets between the multiple processors or multiple processor cores located in data processing system 200. Based on determining how well active RSS key 230 and each of candidate RSS keys 232 are distributing incoming network packets uniformly across the multiple processors or multiple processor cores, performance evaluation function 222 generates a packet distribution score for active RSS key 230 and each of candidate RSS keys 232, such as packet distribution scores 234. In addition, at defined time interval 236, performance evaluation function 222 re-evaluates each of RSS keys 228, which include active RSS key 230 and candidate RSS keys 232. Defined time interval 236 represents a predefined interval of time, such as thirty minutes, one hour, two hours, six hours, twelve hours, one day, or any other interval of time, when performance evaluation function 222 evaluates all keys in RSS keys 228.

Packet distribution manager 218 utilizes replacement module 224 to determine when to discard RSS keys 240 and generate new replacement keys 242. RSS keys 240 represent one or more RSS keys that have a packet distribution score below defined packet distribution threshold score 238. Defined packet distribution threshold score 238 represents a predefined minimum threshold score for uniformly distributing incoming network packet across the multiple processors or multiple processor cores. New replacement keys 242 represent a number of new randomly generated RSS keys, which are to replace the one or more discarded RSS keys 240.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Existing methods for finding an RSS key to distribute network packets to multiple processors are pre-defined. For example, these currently existing methods generate a number of RSS keys and run some template network traffic in a test environment to calculate the results. Then, these currently existing methods select a set of RSS keys with the best result from the number of RSS keys. Afterward, these currently existing methods install the selected set of RSS keys on a multiprocessor device. Then, the multiprocessor device randomly selects one RSS key from the set of RSS keys to distribute the network traffic to multiple processors in the device.

It would be ideal if network load could be uniformly distributed among all available processors in the multiprocessor device. However, uniform packet distribution is difficult, if not impossible, using currently exiting methods because real-time network traffic is dynamic and unpredictable and changes all the time. As a result, using a predefined RSS key set will not provide uniform packet distribution within a multiprocessor device at runtime.

Illustrative embodiments utilize a real-time adaptive RSS key selection method. This method selects the best RSS key for packet distribution in the multiprocessor device based on actual network packets/connections the multiprocessor device is receiving. Illustrative embodiments may utilize, for example, control plane or idle processor resources so that the impact on overall device performance is minimized. Further, by uniformly distributing packets across the multiple processors, illustrative embodiments increase processor resource utilization, increase the amount of network traffic that can be processed by the multiprocessor device and, thus, increase overall device performance.

Illustrative embodiments utilize components, such as, for example: 1) a random key generator to randomly generate RSS keys; 2) an active RSS key that illustrative embodiments currently use to uniformly distribute network packets across the multiple processors; 3) a candidate RSS key pool, which illustrative embodiments use to maintain a set of candidate RSS keys of a predefined size; 4) an evaluation function, which illustrative embodiments use to evaluate RSS key packet distribution performance (e.g., the evaluation function gives an RSS key a higher packet distribution score when that particular RSS key uniformly distributes incoming packets across the multiple processors); and 5) a replacement module, which illustrative embodiments use to remove low-scoring RSS keys (i.e., RSS keys with a packet distribution score below a defined packet distribution threshold score) from the candidate RSS key pool and then replace the discarded RSS keys with new randomly generated RSS keys.

In response to receiving a set of incoming network packets by a multiprocessor device, illustrative embodiments calculate a packet distribution score for the active RSS key and each key in the set of candidate RSS keys using the set of incoming network packets. Illustrative embodiments give an RSS key a higher packet distribution score when the RSS key distributes the set of incoming packets more uniformly than the other RSS keys. In response to receiving an input to reevaluate the RSS keys at a defined time interval, illustrative embodiments sort the set of candidate RSS keys according to their respective packet distribution scores. Then, illustrative embodiments determine whether one or more keys in the set of candidate RSS keys have a higher packet distribution score than the active RSS key. In response to determining that one or more keys in the set of candidate RSS keys do have a higher packet distribution score than the active RSS key, illustrative embodiments replace the active RSS key with the candidate RSS key having the highest packet distribution score.

Thus, illustrative embodiments evaluate each RSS key based on real incoming network packets to determine how well each RSS key is performing with regard to distributing the set of network packets across the multiple processors in a multiprocessor device. However, it should be noted that illustrative embodiments also may distribute network packets across multiple processor cores in a multicore processor. Also, it should be noted that illustrative embodiments may be applied to network devices that are using a data plane development kit, such as, for example, a next generation intrusion prevention system, to improve the performance of such devices by finding and using the best RSS key for uniform distribution of network packets across multiple processors or cores in a runtime environment. The data plane development kit is a set of data plane libraries and network interface controller drivers for fast packet processing.

With reference now to FIG. 3, a diagram of a network packet distribution system is depicted in which illustrative embodiments may be implemented. Network packet distribution system 300 is a system of software and hardware components for automatically distributing incoming network packets across multiple processors or across multiple processor cores uniformly by selecting an RSS key having a highest packet distribution score. Network packet distribution system 300 may be implemented in a network of data processing systems, such as network data processing system 100 in FIG. 1.

In this example, network packet distribution system 300 includes data processing device 302 and network 304. Data processing device 302 may be, for example, server 104 or client 110 in FIG. 1 or data processing system 200 in FIG. 2. Network 304 may be, for example, network 102 in FIG. 1.

Data processing device 302 receives incoming set of network packets 306 via network 304. Set of network packets 306 may represent any type of network traffic and may contain any type of data. Data processing device 302 utilizes packet distribution manager 308, such as packet distribution manager 218 in FIG. 2, to select active RSS key 310 to uniformly distribute set of network packets 312 across processor 314 and processor 316. It should be noted that set of network packets 312 is the same as incoming set of network packets 306. Also, it should be noted that processor 314 and processor 316 may represent any number of processors, such as tens of processors, hundreds of processors, or even thousands of processors, for example.

Active RSS key 310 may be, for example, active RSS key 230 in FIG. 2. Packet distribution manager 308 selects active RSS key 310 based on RSS key 310 having a highest packet distribution score among all RSS keys in a pool of candidate RSS keys, such as RSS keys 228 in FIG. 2. Active RSS key 310 uniformly distributes set of network packets 312 to processor 314 and processor 316 by sending number of packets 318 to processor 314 and number of packets 320 to processor 316. Number of packets 318 and number of packets 320 represent the actual number of network packets sent to processor 314 and processor 316, respectively, for processing. To be uniform, number of packets 318 and number of packets 320 represent an equal number of packets or a number of packets that are substantially equal. For example, if set of network packets 312 is twenty network packets, then number of packets 318 would be ten network packets and number of packets 320 would be ten network packets to be uniformly or evenly distributed to processor 314 and processor 316. Similarly, if set of network packets 312 is twenty-one network packets, then number of packets 318 may be ten network packets and number of packets 320 may be eleven network packets to be substantially uniform.

Further, packet distribution manager 308 utilizes performance evaluation function 322 to determine how well active RSS key 310 is performing with regarding to distributing set of network packets 312 to processor 314 and processor 316. Packet distribution manager 308 may direct performance evaluation function 322 to evaluate the packet distribution performance of active RSS key 310 at the end of a defined time interval period, such as, for example, defined time interval 236 in FIG. 2. After evaluating the packet distribution performance of active RSS key 310, performance evaluation function 322 generates a packet distribution score for active RSS key 310. In addition, performance evaluation function 322 predicts the performance of all RSS keys in the pool of candidate RSS keys using set of network packets 312 and generates a packet distribution score for each of the RSS keys in the pool. If active RSS key 310 has the highest packet distribution score, then packet distribution manager 308 continues to utilize active RSS key 310 to distribute incoming network packets to processor 314 and processor 316. However, if an RSS key in the pool has a higher packet distribution score than active RSS key 310, then packet distribution manager 308 replaces active RSS key 310 with the higher scoring RSS key to distribute incoming network packets.

Figure 4:
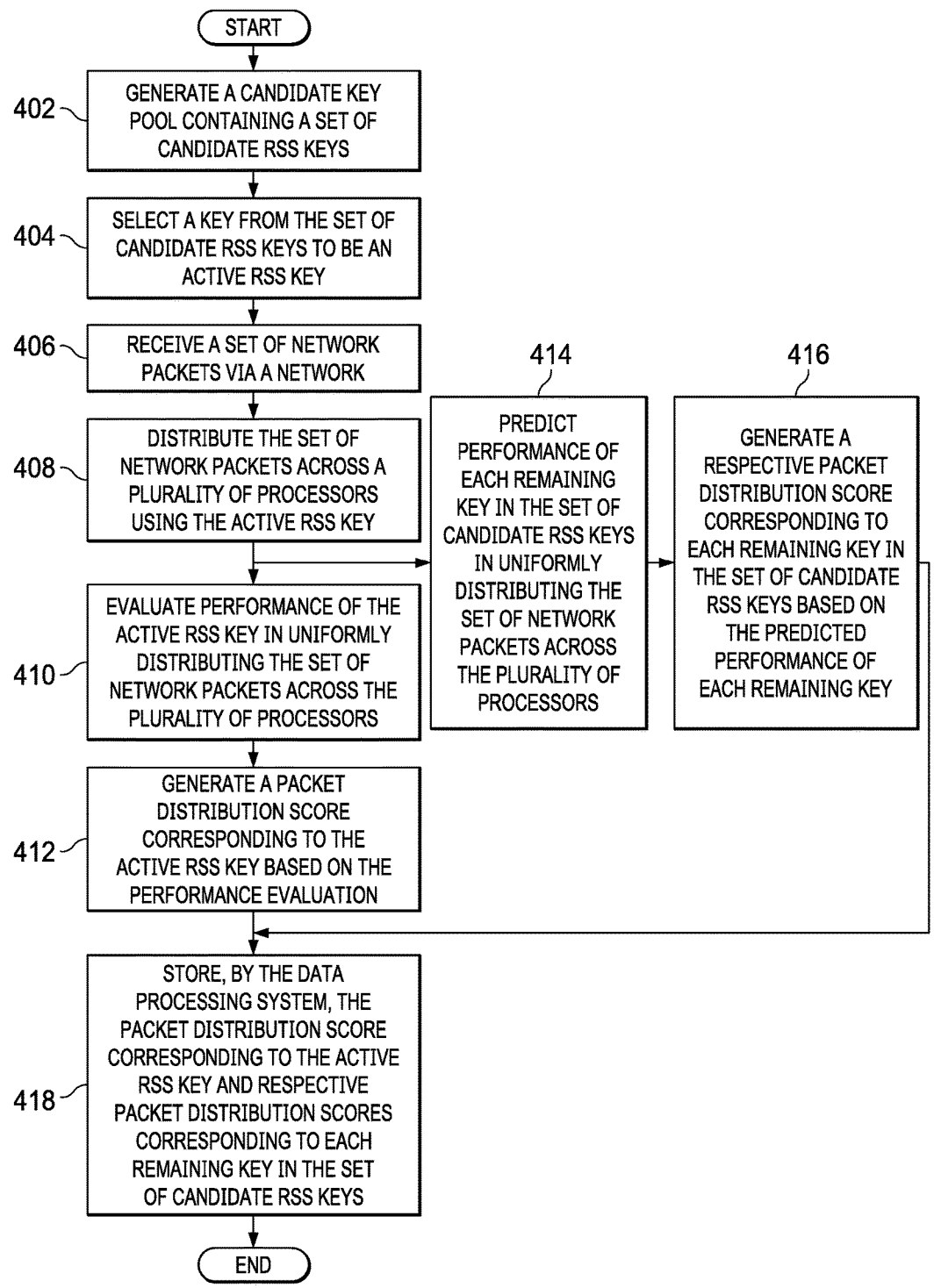
FIG. 4 is a flowchart illustrating a process for evaluating receive side scaling (RSS) key performance in accordance with an illustrative embodiment.

With reference now to FIG. 4, a flowchart illustrating a process for evaluating RSS key performance is shown in accordance with an illustrative embodiment. The process shown in FIG. 4 may be implemented in a data processing system, such as, for example, server 104 or client 110 in FIG. 1 or data processing system 200 in FIG. 2.

The process begins when the data processing system generates a candidate key pool containing a set of randomly generated candidate RSS keys using a random key generator (step 402). The candidate key pool may be, for example, candidate key pool 226 in FIG. 2. The set of randomly generated candidate RSS keys may be, for example, RSS keys 228 in FIG. 2. The random key generator may be, for example, random key generator 220 in FIG. 2.

After generating the candidate key pool in step 402, the data processing system selects a key from the set of randomly generated candidate RSS keys to be an active RSS key for distributing network packets across a plurality of processors located in the data processing system (step 404). The active RSS key selected from the set of randomly generated candidate RSS keys may be, for example, active RSS key 230 in FIG. 2. In addition, the data processing system receives a set of network packets via a network (step 406). The set of network packets may be, for example, set of network packets 312 in FIG. 3. The network may be, for example, network 304 in FIG. 3.

Further, the data processing system distributes the set of network packets across the plurality of processors located in the data processing system using the active RSS key (step 408). The plurality of processors located in the data processing system may be, for example, processor 314 and processor 316 in FIG. 3. Furthermore, the data processing system evaluates performance of the active RSS key in uniformly distributing the set of network packets across the plurality of processors located in the data processing system (step 410). The data processing system may utilize, for example, a performance evaluation function, such as performance evaluation function 322 in FIG. 3, to evaluate the performance of the active RSS key in evenly distributing a number of network packets between each of the plurality of processors to balance load between the plurality of processors. The number of network packets distributed between the plurality of processors may be, for example, number of packets 318 and number of packets 320 in FIG. 3.

Moreover, the data processing system generates a packet distribution score corresponding to the active RSS key based on the evaluation of the performance of the active RSS key in uniformly distributing the set of network packets across the plurality of processors located in the data processing system (step 412). In addition, the data processing system predicts performance of each remaining key in the set of randomly generated candidate RSS keys in uniformly distributing the set of network packets across the plurality of processors located in the data processing system in the background (step 414). The remaining keys in the set of randomly generated candidate RSS keys may be, for example, candidate RSS keys 232 in FIG. 2. The data processing system also generates a respective packet distribution score corresponding to each remaining key in the set of randomly generated candidate RSS keys based on the predicted performance of each remaining key in the set of randomly generated candidate RSS keys in uniformly distributing the set of network packets across the plurality of processors located in the data processing system (step 416). It should be noted that the data processing system performs steps 410 and 412 in parallel with steps 414 and 416.

Subsequently, the data processing system stores the packet distribution score corresponding to the active RSS key and respective packet distribution scores corresponding to each remaining key in the set of randomly generated candidate RSS keys in a storage device (step 418). The packet distribution scores may be, for example, packet distribution scores 234 in FIG. 2. The storage device may be, for example, persistent storage 208 or memory 206 in FIG. 2. Thereafter, the process terminates.

With reference now to FIG. 5, a flowchart illustrating a process for selecting RSS keys is shown in accordance with an illustrative embodiment. The process shown in FIG. 5 may be implemented in a data processing system, such as, for example, server 104 or client 110 in FIG. 1 or data processing system 200 in FIG. 2.

The process begins when the data processing system makes a determination as to whether a defined time interval expired (step 502). The defined time interval may be, for example, defined time interval 236 in FIG. 2. If the data processing system determines that the defined time interval has not expired, no output of step 502, then the process returns to step 502 where the data processing system continues to wait for the defined time interval to expire. If the data processing system determines that the defined time interval has expired, yes output of step 502, then the data processing system retrieves a stored packet distribution score corresponding to an active RSS key (step 504). The stored packet distribution score corresponding to the active RSS key may be, for example, a packet distribution score in packet distribution scores 234 that corresponds to active RSS key 230 in FIG. 2.

In addition, the data processing system retrieves stored packet distribution scores corresponding to each respective key in a set of candidate RSS keys (step 506). The stored packet distribution scores corresponding to each respective key in the set of candidate RSS keys may be, for example, remaining packet distribution scores in packet distribution scores 234 that correspond to each of candidate RSS keys 232 in FIG. 2. Afterward, the data processing system makes a determination as to whether one or more keys in the set of candidate RSS keys have a higher packet distribution score than the active RSS key (step 508). If the data processing system determines that no keys in the set of candidate RSS keys have a higher packet distribution score than the active RSS key, no output of step 508, then the data processing system continues to use the active RSS key to distribute incoming network packets across a plurality of processors located in the data processing system (step 510). The incoming network packets distributed across the plurality of processors may be, for example, set of network packets 312 distributed across processor 314 and processor 316 in data processing device 302 in FIG. 3.

If the data processing system determines that one or more keys in the set of candidate RSS keys have a higher packet distribution score than the active RSS key, yes output of step 508, then the data processing system selects an RSS key having a highest packet distribution score from the one or more keys in the set of candidate RSS keys that have a higher packet distribution score than the active RSS key (step 512). Further, the data processing system uses the RSS key having the highest packet distribution score to distribute the incoming network packets across the plurality of processors located in the data processing system (step 514). Furthermore, the data processing system makes a determination as to whether any keys in the set of candidate RSS keys have a packet distribution score less than a defined packet distribution threshold score (step 516). The defined packet distribution threshold score may be, for example, defined packet distribution threshold score 238 in FIG. 2.

If the data processing system determines that no keys in the set of candidate RSS keys have a packet distribution score less than the defined packet distribution threshold score, no output of step 516, then the process returns to step 502 where the data processing system waits for the next defined time interval to expire. If the data processing system determines that one or more keys in the set of candidate RSS keys have a packet distribution score less than the defined packet distribution threshold score, yes output of step 516, then the data processing system discards those RSS keys, such as RSS keys 240 in FIG. 2, having a packet distribution score less than the defined packet distribution threshold score (step 518). The data processing system also generates a number of new RSS keys to replace those discarded RSS keys having a packet distribution score less than the defined packet distribution threshold score (step 520). The number of new RSS keys replacing the discarded RSS keys may be, for example, new replacement keys 242 in FIG. 2. Thereafter, the process returns to step 502 where the data processing system waits for the next defined time interval to expire.

Thus, illustrative embodiments of the present invention provide a computer-implemented method, computer system, and computer program product for selecting an RSS key having a highest packet distribution score to balance distribution of incoming network packets across multiple processors in a multiprocessor device or across multiple processor cores in one multicore processor. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting a receive side scaling (RSS) key, the computer-implemented method comprising:
   determining, by a data processing system, whether a defined time interval expired;
   responsive to the data processing system determining that the defined time interval has expired, determining, by the data processing system, whether one or more keys in a set of randomly generated candidate RSS keys have a higher packet distribution score than an active RSS key;
   responsive to the data processing system determining that the one or more keys in the set of randomly generated candidate RSS keys have the higher packet distribution score than the active RSS key, selecting, by the data processing system, an RSS key having a highest packet distribution score from the one or more keys in the set of randomly generated candidate RSS keys that have the higher packet distribution score than the active RSS key; and
   using, by the data processing system, the RSS key having the highest packet distribution score to distribute incoming network packets across a plurality of processors corresponding to the data processing system.

2. The computer-implemented method claim 1 further comprising:
   responsive to the data processing system determining that no keys in the set of randomly generated candidate RSS keys have the higher packet distribution score than the active RSS key, continuing to use, by the data processing system, the active RSS key to distribute the incoming network packets across the plurality of processors corresponding to the data processing system.

3. The computer-implemented method claim 1 further comprising:
   determining, by the data processing system, whether the one or more keys in the set of randomly generated candidate RSS keys have a corresponding packet distribution score less than a packet distribution threshold score; and
   responsive to the data processing system determining that the one or more keys in the set of randomly generated candidate RSS keys have the corresponding packet distribution score less than the packet distribution threshold score, discarding, by the data processing system, those RSS keys having the corresponding packet distribution score less than the packet distribution threshold score.

4. The computer-implemented method claim 3 further comprising:
   randomly generating, by the data processing system, a number of new RSS keys to replace those discarded RSS keys having the corresponding packet distribution score less than the packet distribution threshold score.

5. The computer-implemented method claim 1 further comprising:
   generating, by the data processing system, a candidate key pool containing the set of randomly generated candidate RSS keys; and
   selecting, by the data processing system, a key from the set of randomly generated candidate RSS keys to be the active RSS key for distributing the incoming network packets across the plurality of processors corresponding to the data processing system.

6. The computer-implemented method claim 1 further comprising:

receiving, by the data processing system, the incoming network packets via a network;

distributing, by the data processing system, the incoming network packets across the plurality of processors corresponding to the data processing system using the active RSS key;

evaluating, the data processing system, performance of the active RSS key in uniformly distributing the incoming network packets across the plurality of processors corresponding the data processing system; and generating, by the data processing system, a packet distribution score corresponding to the active RSS key based on the evaluating of the performance of the active RSS key in uniformly distributing the incoming network packets across the plurality of processors corresponding to the data processing system.

7. The computer-implemented method claim 6, wherein the active RSS key uniformly distributes the incoming network packets across the plurality of processors by sending an equal number of network packets to each processor in the plurality of processors.

8. The computer-implemented method claim 1 further comprising:

predicting, by the data processing system, performance of each key in the set of randomly generated candidate RSS keys in uniformly distributing the incoming network packets across the plurality of processors corresponding to the data processing system in a background; and generating, by the data processing system, a respective packet distribution score corresponding to each key in the set of randomly generated candidate RSS keys based on the predicting of the performance of each key in the set of randomly generated candidate RSS keys in uniformly distributing the incoming network packets across the plurality of processors corresponding to the data processing system.

* * * * *